Oct. 19, 1965       E. P. WORTHEN ETAL                3,212,241
                       VAPOR SEPARATOR
Filed Aug. 21, 1961                              2 Sheets-Sheet 1

INVENTORS
Eugene Porter Worthen
Ralph Albin Sodersjerna
BY Natt M Emery Jr.
ATTORNEY Oct. 19, 1965   E. P. WORTHEN ETAL   3,212,241
VAPOR SEPARATOR
Filed Aug. 21, 1961   2 Sheets-Sheet 2
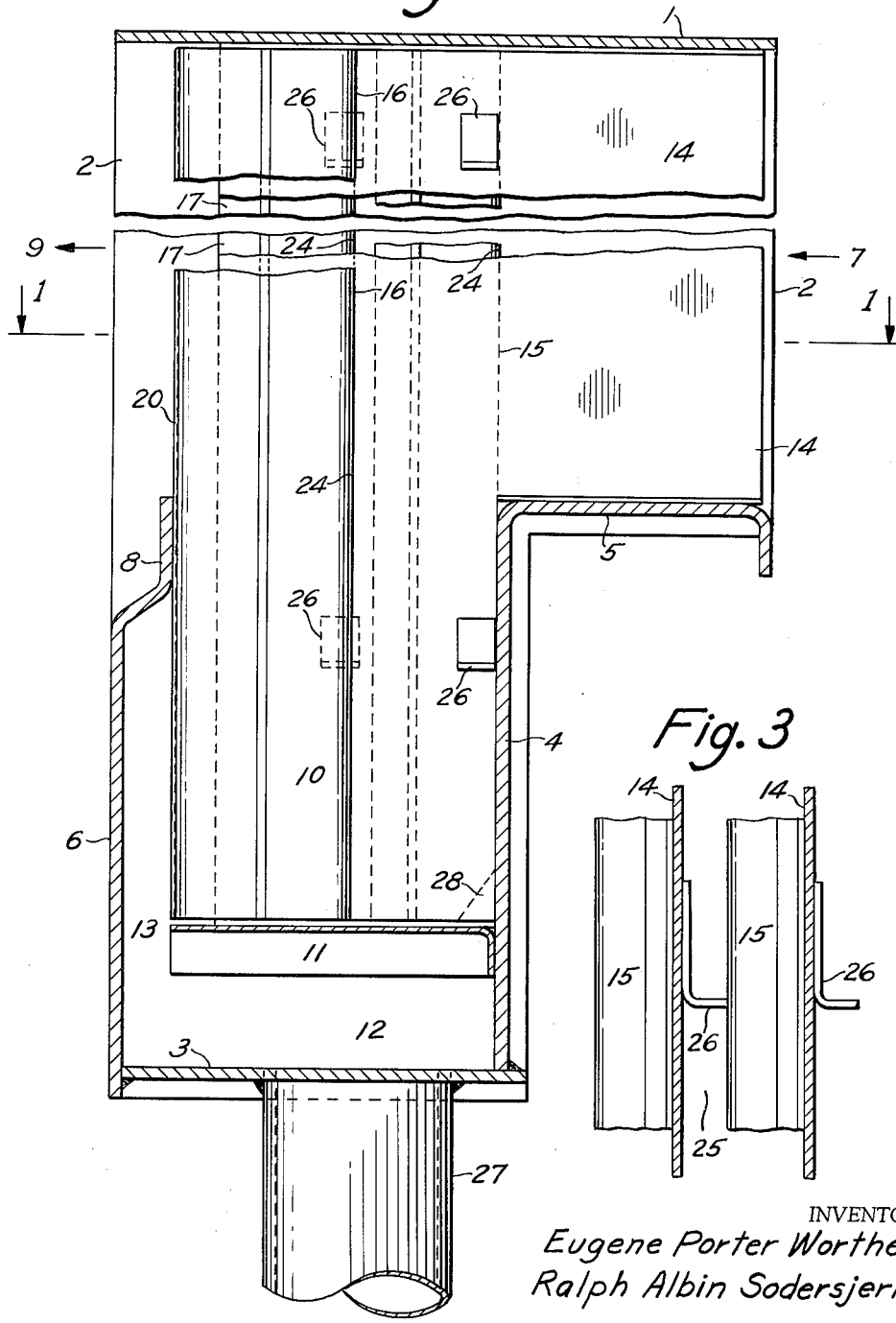
INVENTORS
Eugene Porter Worthen
Ralph Albin Sodersjerna
BY Nat M Emery Jr.
ATTORNEY United States Patent Office 3,212,241
Patented Oct. 19, 1965

3,212,241
VAPOR SEPARATOR
Eugene Porter Worthen, East Braintree, and Ralph Albin Sodersjerna, Hingham, Mass., assignors, by mesne assignments, to Bethlehem Steel Corporation, a corporation of Delaware
Filed Aug. 21, 1961, Ser. No. 132,784
9 Claims. (Cl. 55—444)

This application is a continuation-in-part of application Serial No. 57,730, filed September 22, 1960, and now abandoned.

This invention relates generally to vapor separators for distilling plants and specifically to a novel design and disposition of the baffle hooks in such a vapor separator.

Recent demands for large distilling units of high efficiency for producing distilled water disclose the need for smaller, less expensive, and more effective vapor sepators having less resistance to flow of vapor than in presently available vapor separators.

Pressure drop of the vapor in passing through a vapor separator is accompanied by a reduction in vapor temperature. This in turn results in a loss of efficiency, and a consequent increase in heat consumption, of the distilling plant. In large multistage flash type distilling plants, the loss of efficiency due to vapor pressure drop in existing vapor separators may amount to as much as ten to fifteen percent.

When the pressure drop through the vapor separator is reduced, there results an appreciable increase in efficiency of the distilling plant, with a consequent reduction of heat consumption. This permits a reduction in the size of the distilling plant since additional heat transfer surface, which was necessary to compensate for the loss in efficiency due to the higher pressure drop through the older vapor separators, is no longer required.

The present invention is an improvement over the vapor separator shown in U.S. Patent 2,439,536 to E. P. Worthen et al., the latter comprising a plurality of flat division plates mounted inside a case or housing parallel to each other and to the direction of flow of the incoming vapor, with baffle hooks secured to the division plates and to the inside walls of the case. The improvement comprises streamlining the baffle hooks, and curving the leading edges of said baffle hooks towards the division plates to which they are mounted so as to form rounded entrances to the orifices defined by said leading edges and the adjacent division plates; further, the baffle hooks and adjacent division plates define diverging nozzles behind the aforementioned orifices; finally, the baffle hooks are so spaced, front to back, that each diverging nozzle is fully and gradually expanded (i.e., gradually attains its maximum opening between division plates) before and in front of the next orifice.

One of the objects of our invention is to provide a vapor separator through which the pressure drop is markedly and significantly lower than in existing vapor separators.

Another object of our invention is to provide a vapor separator in which the baffle hooks are streamlined, and the leading edges thereof curved towards the division plates to which they are mounted so as to form rounded entrances to the orifices defined by said leading edges and the adjacent division plates, and in which the baffle hooks and the adjacent division plates defined diverging nozzles behind the aforementioned orifices, and in which the baffle hooks are so spaced, front to back, that each diverging nozzle is fully and gradually expanded before and in front of the next orifice.

Yet another of our invention is to provide spacing means in such a vapor separator between the baffle hooks and the adjacent division plates to insure proper spacing therebetween thereby to provide effective separation with minimum pressure drop.

Still another object of our invention is to provide smaller, less expensive and more effective vapor separators than are presently available.

Other and further objects of our invention will become apparent during the course of the following description.

Referring now to the drawings, in which like numerals represent like parts in the several views:

FIG. 2 represents a section in elevation taken along the line 2—2 of FIG. 1.

FIG. 3 represents an enlarged section in elevation taken along the line 3—3 of FIG. 1, and the shows the spacer detail.

Figure 1:
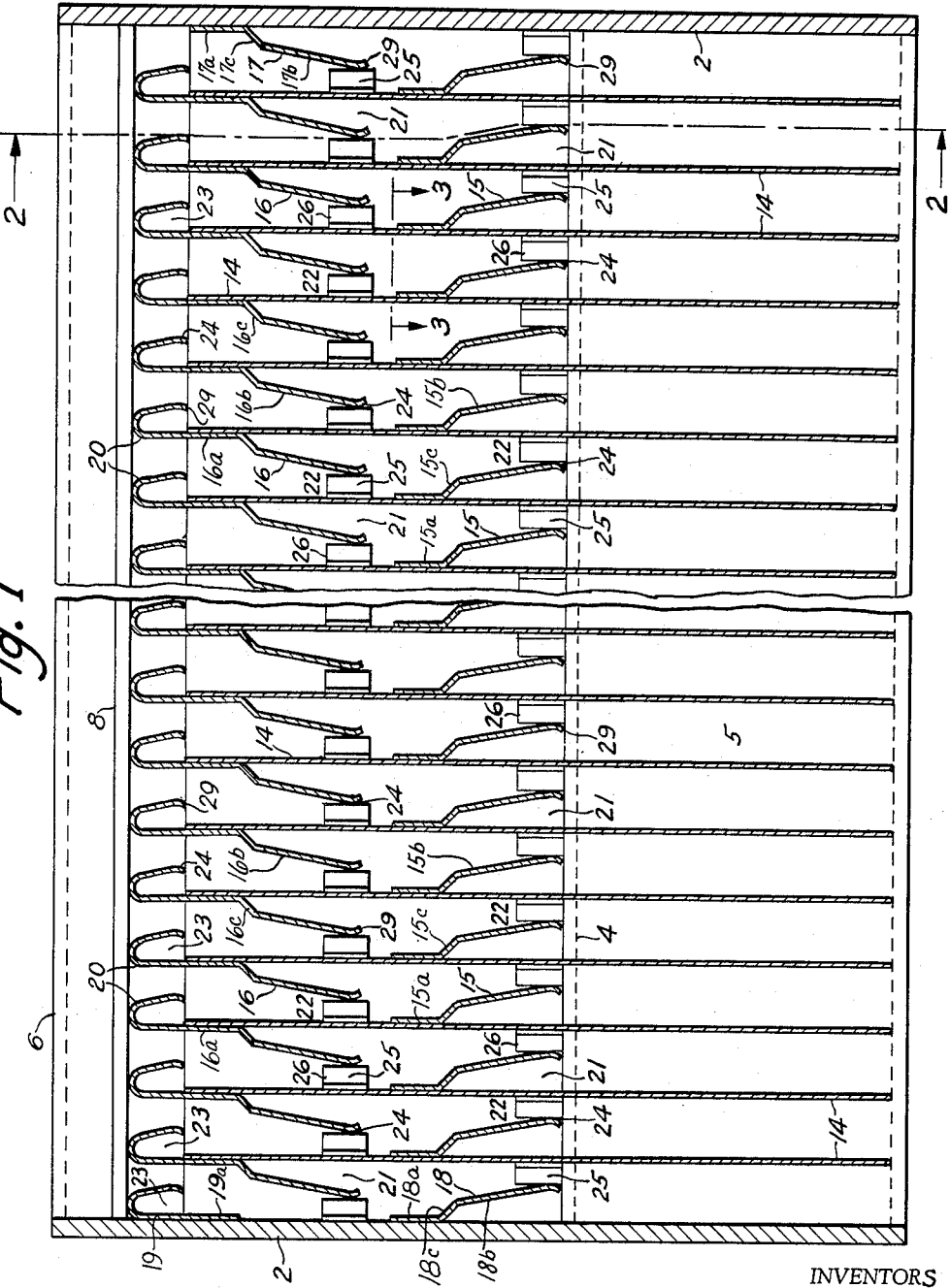
FIG. 1 represents a section in plan taken along the line 1—1 of FIG. 2 and shows only so many of the division plates and baffle hooks mounted on the case or housing of the vapor separator as are necessary to a full and complete comprehension of our invention.

The case or housing of the vapor separator comprises top plate 1, side plates 2, bottom plate 3, front plate 4, splash plate 5, and rear plate 6. It will be seen that top plate 1, side plates 2 and splash plate 5 bound and define inlet opening 7, and that top plate 1, side plates 2 and the inset upper portion 8 of rear plate 6 bound and define outlet opening 9.

Settling chamber 10 is defined by side plates 2, rear plate 6, front plate 4, and drain plate 11, the latter extending between said side plates 2.

Drain chamber 12 is defined by side plates 2, rear plate 6, front plate 4, drain plate 11 and bottom plate 3, and communicates with settling chamber 10 through opening 13 between drain plate 11 and rear plate 6.

Parallel division plates 14 are mounted in the case or housing of the vapor separator in horizontally spaced relation and extend from the drain plate 11 and from the splash plate 5 up to the top plate 1. Baffle hooks 15 and 16 are mounted to division plates 14 through attachment portions 15a and 16a respectively, and baffle hooks 17 and 18 and rear hooks 19 are mounted to side plates 2 through attachment portions 17a, 18a and 19a respectively, as shown in FIG. 1, all of said hooks extending the full height of said division plates 14. Baffle hooks 15 and 18 have the lower leading corners snipped to provide openings 28 for drainage. Rear hook 20 is, in the preferred embodiment, formed integrally with attachment portion 16a of baffle hook 16, which attachment portion 16a is mounted to one side of division plate 14, rear hook 20 extending rearwardly thereof and being operative along the opposite side of said division plate 14.

Baffle hooks 15, 16, 17 and 18, arranged in two ranks as viewed from the side of the vapor separator (i.e., as viewed from the left or right of FIG. 1) are provided with substantially flat-walled portions 15b, 16b, 17b and 18b, respectively, which are secured, through transition portions 15c, 16c, 17c and 18c, respectively, to attachment portions 15a, 16a, 17a and 18a, respectively. It will be seen from FIG. 1 that substantially flat-walled portions 15b, 16b, 17b and 18b define diverging substantially flat-walled nozzles 22 with the adjacent division plates 14 and side plates 2, and, from FIG. 3, that rectangular throats 25 are defined by division plates 14 and side plates 2 and the forwardmost ends of said flat-walled portions 15b, 16b, 17b, and 18b, said rectangular throats 25 being bounded at the top and bottom by top plate 1 and drain plate 11 respectively as shown in FIG. 2. It is also seen, from FIG. 1, that substantially flat-walled nozzles 22 diverge rearwardly immediately behind rectangular throats 25. Baffle hooks 15, 16, 17 and 18 are also provided, immediately ahead of substantially flat-walled portions 15b, 16b, 17b and 18b, with curved or rounded nose portions 24 terminating in leading edges 29 projecting generally toward inlet opening 7 of the separator. It will be seen, from FIG. 1, that curved or rounded nose portions 24 provide rounded entrances to rectangular throats 25. Baffle hooks 15, 16, 17 and 18 define, with the division plates 14 and side plates 2 to which they are mounted, pockets 21 opening toward inlet opening 7. Rear hooks 19 and 20, as shown in FIG. 1, provide pockets 23 opening toward inlet opening 7.

The angle of divergence of nozzles 22 may vary between approximately 7° and approximately 17°. The smaller of these angles produces the lowest pressure drop through the vapor separator but necessitates a separator of greater depth from front to rear. The larger of these angles permits a separator of smaller depth, but results in increased pressure drop through the separator. We found that the optimum angle is approximately 10°.

The rear hooks 19 and 20 are preferably similar in configuration to the baffle hooks 15, 16, 17 and 18; that is they extend at an acute angle from the plates to which they are secured and have inturned nose portions 24 terminating in leading edges 29 which project generally toward the entrance of the separator.

It will be seen that each diverging substantially flat-walled nozzle 22, as defined by substantially flat-walled portions 15b, 16b, 17b and 18b and division plates 14 and side plates 2, attains its maximum expansion or opening before and in front of the succeeding rectangular throat 25.

It is important that the spacing of the baffle hooks 15, 16, 17 and 18 be accurately maintained relative to the division plates 14 and side plates 2. If, when viewed from the front of the vapor separator, light from the rears is seen, then the efficiency of said separator will be poor. If, on the other hand, the baffle hooks overlap to any considerable extent, the pressure drop through the separator will be high. Ideally, the baffle hooks should be so spaced that, when viewed from the front, light from the rear is just extinguished. We prefer, to insure separation efficiency, to place said baffle hooks so that the same overlap by about $\frac{1}{32}$". That is, referring to FIG. 1, the leftmost extremity of baffle hooks 16 and 17 is about $\frac{1}{32}$" to the left of the rightmost extremity of the preceding baffle hooks 15 and 18. To maintain the spacing to such a close figure, we employ spacers 26 which are secured to division plates 14 and side plates 2, and which bear against said baffle hooks 15, 16, 17 and 18, as shown in the drawings.

The operation of the vapor separator will now be described.

Vapor enters the vapor separator through inlet open- 7 and travels in a multiplicity of parallel paths defined by division plates 14 and side plates 2. For approximately half the depth of the vapor separator (viz., up to the first rank of baffle hooks 15 and 18), turbulence in the streams of vapor tends to throw entrained water particles against the division plates 14 and side plates 2 to which the said water particles adhere and along which the said water particles are forced by the vapor streams until the said water particles enter the first rank of pockets 21. Water thus separated runs down these pockets 21 to the drain plate 11.

The forwardmost portions of the first rank of baffle hooks (15 and 18) cause the vapor streams to make a change in direction and to pass into rectangular throats 25. The passage of the vapor streams through rectangular throats 25 increases the velocity of the vapor, the rounded entrances to such rectangular throats 25 permitting such velocity increase with mimimum eddying and friction losses. In the nozzles 22 of the first rank of baffle hooks (15 and 18), the high vapor velocity is gradually reduced with minimum eddying and friction losses and with the conversion of a large portion of velocity energy back to pressure energy (with a corresponding reduction of the pressure loss from the passage of the vapor through rectangular throats 25). The water droplets, however, retain a substantial part of the velocity imparted to them in the rectangular throats 25 and are propelled into the pockets formed by the second rank of baffle hooks (16 and 17).

The forwardmost portions of the second rank of baffle hooks (16 and 17) cause the vapor streams from the nozzles 22 of the first rank of baffle hooks (15 and 18) to make another change of direction and to pass into rectangular throats 25 of said second rank of baffle hooks (16 and 17). Again, the vapor is accelerated, the high velocity gradually being reduced in the nozzles 22 of said second rank of baffle hooks (15 and 18) with a maximum conversion of velocity energy back to pressure energy.

The two ranks of baffle hooks and the rear hooks in series force the vapor to make three changes of direction during which the entrained moisture particles tend to be thrown against the division plates and side plates and forced into the pockets defined by said baffle hooks and rear hooks, the vapor thus freed of entrained water particles passing out of the vapor separator through outlet opening 9.

The deentrained water from pockets 23 of rear hooks 19 and 20 passes down to drain plate 11 and with the water from pockets 21 of the first and second ranks of baffle hooks flows over the rear of drain plate 11 to drain chamber 12, whence it is removed through drain connection 27 (which may be sealed against back flow of vapor by means of a water seal, well-known in the art and therefore not shown here).

It will be noted that, due to the streamlining of the two ranks of baffle hooks, and due to the diverging nozzles 22 of said two ranks, the velocity of the vapor issuing from the rectangular throats 25 of each rank is gradually reduced and the pressure thereof increased with minimum losses before the vapor from the rectangular throats 25 of the first rank reaches the rectangular throats 25 of the second rank and before the vapor from the rectangular throats 25 of the second rank reach the area of the rear hooks 19 and 20. Were it not for such streamlining and such gradual reduction of vapor velocity, and particularly for the optimum nozzle angle, the high velocity vapor from the rectangular throats 25 of the first rank would blast directly into the pockets 21 of the second rank, and the high velocity vapor from the rectangular throats 25 of the second rank would blast directly into the pockets 23 of the rear hooks 19 and 20, all with eddying and turbulence resulting in a higher pressure drop.

Although we have thus described our invention in considerable detail, we do not wish to be limited narrowly to the exact and specific particulars disclosed, but we may also use substitutes, modifications or equivalents thereof as are included within the scope and spirit of the invention or as pointed out in the appended claims.

We claim:

1. A vapor separator comprising:
   (a) a housing having a top and a bottom, a front inlet opening and a rear outlet opening opposed to said front inlet opening,
   (b) first and second flat spaced division plates in said housing arranged parallel to each other and extending from the top of said housing toward the bottom thereof and from the front inlet opening toward the rear outlet opening,
   (c) a first member in said housing extending from the top of said housing toward the bottom thereof, said first member being secured to said first division plate and extending forwardly of the region of securement thereto toward the front inlet opening and defining with the second division plate a venturi having:
       a rectangular throat,
       a rounded entrance to said rectangular throat, between said rectangular throat and said front inlet opening,
a substantially flat-walled nozzle extending rearwardly from said rectangular throat and diverging toward said rear outlet opening,
said first member defining with the first division plate a first pocket opening toward the front inlet opening,
(d) a second member in said housing extending from the top of said housing toward the bottom thereof, said second member being secured to said second division plate and extending into the space between said first and second division plates projected rearwardly toward said rear outlet opening, said second member defining a second pocket behind and entirely without the boundaries of said substantially flat-walled nozzle, said second pocket opening toward the front inlet opening.

2. Apparatus as in claim 1, the angle of divergence of said substantially flat-walled nozzle being between approximately 7° and approximately 17°.

3. A vapor separator comprising:
(a) a housing having a top and a bottom, a front inlet opening and a rear outlet opening opposed to said front inlet opening,
(b) first and second flat spaced division plates in said housing arranged parallel to each other and extending from the top of said housing toward the bottom thereof and from the front inlet opening toward the rear outlet opening,
(c) a first member in said housing extending from the top of said housing toward the bottom thereof, said first member being secured to said first division plate and extending forwardly of the region of securement thereto toward the front inlet opening and defining with the second division plate a first venturi having:
a first rectangular throat,
a first rounded entrance to said first rectangular throat between said first rectangular throat and said front inlet opening,
a first substantially flat-walled nozzle extending rearwardly from said first rectangular throat and diverging toward said rear outlet opening,
said first member defining with said first division plate a first pocket opening toward the front inlet opening,
(d) a second member in said housing extending from the top of said housing toward the bottom thereof, said second member being secured to said second division plate between said first member and said rear outlet opening and extending forwardly of the region of securement to said second division plate toward the front inlet opening and defining with the first division plate a second venturi having:
a second rectangular throat,
a second rounded entrance to said second rectangular throat between said second rectangular throat and said front inlet opening,
a second substantially flat-walled nozzle extending rearwardly from said second rectangular throat and diverging toward said rear outlet opening, said second member defining with said second division plate a second pocket opening toward the front inlet opening,
(e) said second pocket being behind and entirely without the boundaries of said first substantially flat-walled nozzle.

4. Apparatus as in claim 3, the angle of divergence of said first and second substantially flat-walled nozzles being between approximately 7° and approximately 17°.

5. Apparatus as in claim 3, further including:
(f) a third member in said housing extending from the top of said housing toward the bottom thereof, said third member being secured to said first division plate and extending into the space between said first and second division plates projected rearwardly toward said rear outlet opening, said third member defining a third pocket behind and entirely without the boundaries of said second substantially flat-walled nozzle, said third pocket opening toward the front inlet opening.

6. A vapor separator comprising:
(a) a housing having a top and a bottom, a front inlet opening and a rear outlet opening opposed to said front inlet opening, a first side between the top and the bottom and between the front inlet opening and the rear outlet opening, and a second side between the top and the bottom and between the front inlet opening and the rear outlet opening and opposed to said first side,
(b) a plurality of flat spaced division plates in said housing arranged parallel to each other and extending from the top of said housing toward the bottom thereof and from the front inlet opening toward said rear outlet opening, each of said division plates having a first face and a second face, all of said first faces facing the first side of said housing and all of said second faces facing the second side of said housing,
(c) a plurality of first members in said housing extending from the top of said housing toward the bottom thereof, each of said first members being secured to a first face of one of said division plates and extending forwardly of the region of securement thereto toward the front inlet opening, each of said first members defining with the second face of the adjacent division plate a venturi having:
a rectangular throat,
a rounded entrance to said rectangular throat between said rectangular throat and said front inlet opening,
a substantially flat-walled nozzle extending rearwardly from said rectangular throat and diverging toward said rear outlet opening,
each of said first members defining with its respective division plate a first pocket opening toward the front inlet opening,
(d) a plurality of second members in said housing extending from the top of said housing toward the bottom thereof, each of said second members being secured to one of said division plates and extending into the space between said division plates projected rearwardly toward said rear outlet opening, each of said second members defining a second pocket behind and entirely without the boundaries of the adjacent substantially flat-walled nozzle and opening toward said front inlet opening.

7. A vapor separator comprising:
(a) a housing having a top and a bottom, a front inlet opening and a rear outlet opening opposed to said front inlet opening, a first side between the top and the bottom and between the front inlet opening and the rear outlet opening, and a second side between the top and the bottom and between the front inlet opening and the rear outlet opening and opposed to said first side,
(b) a plurality of flat spaced division plates in said housing arranged parallel to each other and extending from the top of said housing toward the bottom thereof and from the front inlet opening toward said rear outlet opening, each of said division plates having a first face and a second face, all of said first faces facing the first side of said housing and all of said second faces facing the second side of said housing,
(c) a plurality of first members in said housing extending from the top of said housing toward the bottom thereof, each of said first members being secured to a first face of one of said division plates and extending forwardly of the region of securement thereto toward the front inlet opening, each of said first members defining with the second face of the adjacent division plate a first venturi having:
- a first rectangular throat,
- a first rounded entrance to said first rectangular throat between said first rectangular throat and said front inlet opening,
- a first substantially flat-walled nozzle extending rearwardly from said first rectangular throat and diverging toward said rear outlet opening, each of said first members defining with its respective division plate a first pocket opening toward the front inlet opening, (d) a plurality of second members in said housing between said plurality of first members and said rear outlet opening, said second members extending from the top of said housing toward the bottom thereof, each of said second members being secured to a second face of one of said division plates and extending forwardly of the region of securement thereto toward the front inlet opening, each of said second members defining with the first face of the adjacent division plate a second venturi having:
- a second rectangular throat,
- a second rounded entrance to said second rectangular throat between said second rectangular throat and said front inlet opening,
- a second substantially flat-walled nozzle extending rearwardly from said second rectangular throat and diverging toward said rear outlet opening, each of said second members defining with its respective division plate a second pocket opening toward said front inlet opening, (e) each of said second pockets being behind and entirely without the boundaries of the adjacent first substantially flat-walled nozzle.

8. Apparatus as in claim 7, further including:
(f) a plurality of third members in said housing between said plurality of second members and said rear outlet opening, said third members extending from the top of said housing toward the bottom thereof, each of said third members being secured to one of said division plates and extending into the space between said division plates projected rearwardly toward said rear outlet opening, each of said third members defining a third pocket behind and entirely without the boundaries of the adjacent second substantially flat-walled nozzle and opening toward said front inlet opening.

9. A vapor separator comprising:
(a) a housing having a top and a bottom, a front inlet opening and a rear outlet opening opposed to said front inlet opening, (b) first, second and third flat spaced division plates in said housing arranged parallel to each other and extending from the top of said housing toward the bottom thereof and from the front inlet opening toward the rear outlet opening, each of said division plates having a first face and a second face, all of said first faces facing in one direction and all of said second faces facing in the opposite direction, (c) a member in said housing extending from the top of said housing toward the bottom thereof, said member having:
- a flat medial portion secured to the first face of the second division plate,
- a forward portion extending forwardly of the flat medial portion between said first and second division plates and defining with the second face of the first division plate a venturi having:
  - a rectangular throat,
  - a rounded entrance to said rectangular throat between said rectangular throat and said front inlet opening,
  - a substantially flat-walled nozzle extending rearwardly from said rectangular throat and diverging toward said rear outlet opening, said forward portion defining with the first face of said second division plate a first pocket opening toward the front inlet opening,
- a rear portion extending rearwardly of the flat medial portion behind said second division plate into the space between said second and third division plates projected rearwardly toward said rear outlet opening and defining a second pocket adjacent the second face of said second division plate, said second pocket opening toward the front inlet opening.

References Cited by the Examiner

UNITED STATES PATENTS

| 652,070 | 6/00 | Baker | 55—446 |
| 1,603,878 | 10/26 | Smith | 55—428 |
| 1,916,528 | 7/33 | Raymond | 55—442 |
| 2,439,536 | 4/48 | Worthen et al. | 55—445 |

FOREIGN PATENTS

| 429,859 | 6/26 | Germany. |

HARRY B. THORNTON, *Primary Examiner.*